Feb. 11, 1947.　　　T. G. FREDERICK　　　2,415,737
FILM FEED MECHANISM
Filed March 4, 1946
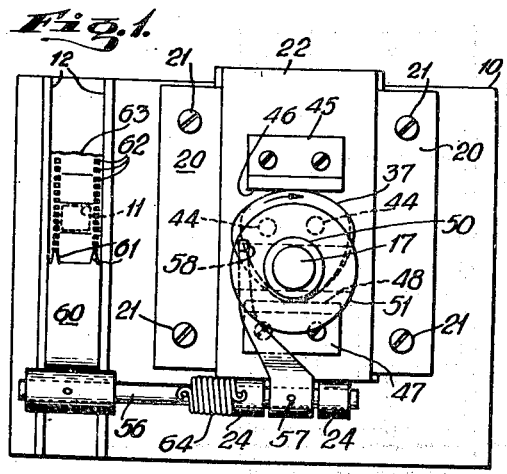
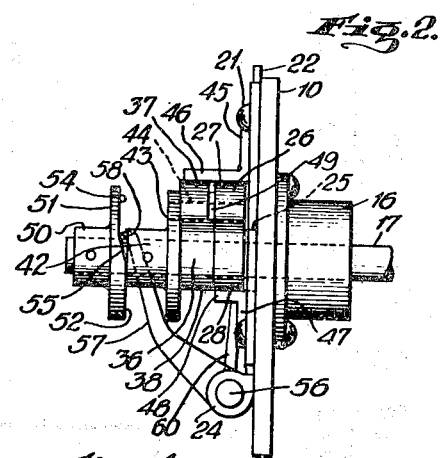
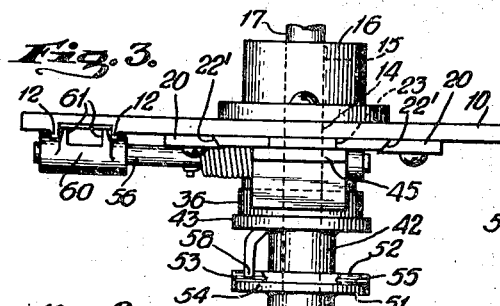
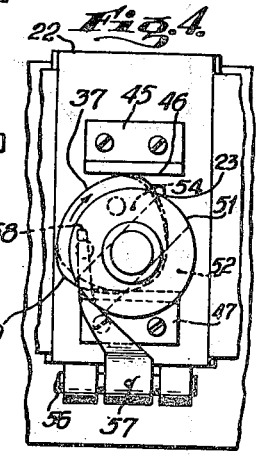
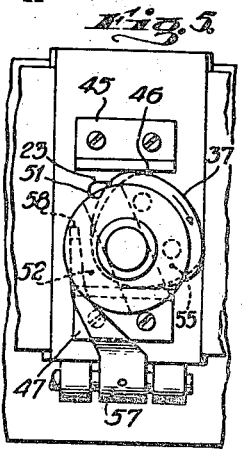
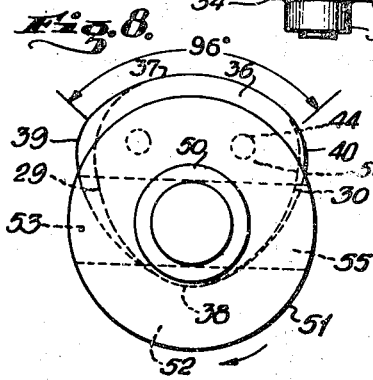
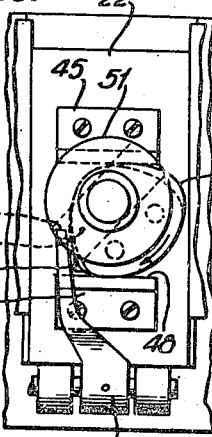
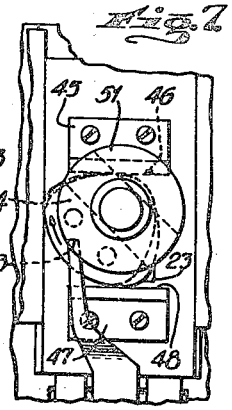
INVENTOR
TILGHMAN G. FREDERICK
BY
ATTORNEY Patented Feb. 11, 1947

2,415,737

UNITED STATES PATENT OFFICE 2,415,737

FILM FEED MECHANISM

Tilghman G. Frederick, New York, N. Y.

Application March 4, 1946, Serial No. 651,880

18 Claims. (Cl. 88—18.4)

This invention relates to reciprocatory motions and to means for feeding motion picture film and more particularly to a motion picture film feeding mechanism for continuous automatic projectors though it is noted in the claims the invention is not limited to continuous projectors or projectors.

One object of the invention is to provide an improved mechanism of this kind which will allow the film to remain a long time stationary in film projecting and exposing position and will then feed the film quickly to the next projecting or exposing position with an easy smooth movement which will not injure the film.

Other objects of the invention are to provide an improved film feeding device of this kind which is substantially noiseless in operation and free from lost motion or vibration, and which will run a very long time without wearing out the film.

Additional objects of the invention are to effect simplicity and efficiency in such apparatus and to provide an extremely simple apparatus of this kind which is very economical, durable and reliable in operation, and economical to manufacture and easy to install.

Still other objects of the invention will appear as the description proceeds; and while herein details of the invention are described in the specification and some of the claims, the invention as described in some of the broader claims is not limited to these, and many and various changes may be made without departing from the scope of the invention as claimed in the broader claims.

The inventive features for the accomplishment of these and other objects are shown herein in connection with improved film feeding mechanisms each of which briefly stated, includes a frame plate carrying a reciprocatory member having fast thereon opposing abutments transverse to its path. A rotary drive shaft between said abutments has mounted fast thereon feed and take-up cams having peripheral cam faces at all times engageable with said feed and take-up abutments respectively and each including a long land portion of constant long radius, an opposite land portion of short radius and a pair of intermediate cam portions merging smoothly into the land portions, the portions of each cam being adjacent corresponding portions of the other cam.

Claw means operated by an in-and-out cam on said shaft engage the film and feed the film as soon as the long land portion of the take-up cam leaves the take-up abutment and disengage the film after the long land portion of the feed cam reaches the feed abutment.

The radii of the intermediate portions of the take-up cam are longer than the corresponding radii of the feed cam, and the long land portion of the take-up cam, which engages the take-up abutment during film exposure, is as long as about 96 degrees and much longer than the long land portion of the feed cam, whereby the film is held in exposure position during as much as 96 degrees of the revolution of the drive shaft.

In the accompanying drawing showing, by way of example, two of many embodiments of the invention, Fig. 1 is an elevation showing one film feed mechanism;

Figs. 2 and 3 are respectively side elevation and plan of the same;

Figs. 4 to 7 are fragmental front elevations showing successive positions of the cams;

Fig. 8 is a front elevation on an enlarged scale showing the relative positions of the various cam faces; and Fig. 9 and 10 are respectively side and end elevations showing another form of cams, parts being removed.

The various parts of my improved film feeding mechanism are carried on a suitably supported mounting plate or frame 10 having therein a film-gate 11 (Fig. 5) and guides 12 adjacent thereto. A bearing bore 14 through the plate and an axial bore 15 of a bearing boss 16 secured on the rear of the plate and alined with the bore of the plate provide a main bearing for the main drive shaft 17. Opposed vertical guide strips 20 fixed by screws 21 to said plate and having undercut edge faces 22' on opposite sides of said axis guide a reciprocatory plate member 22 slidable on said mounting plate between and guided by said undercut edges and held on said plate by said edges and provided with a vertically elongated central opening 23 (Figs. 3 to 7) exposing said main bearing, the plate being provided at its lower edge with spaced bearing ears 24 having alined bearing bores transverse to the path of the plate. Said main drive shaft 17 in said main bearing projects at both ends and is adapted to be connected to and rotated at its rear end by a suitable source of power.

A spacing collar 25 (Fig. 2) fast on said shaft in said opening is engaged by a fed cam 26 mounted fast on said shaft against the collar flange. Said cam 26 has a peripheral cam face including a long outer land portion 28 of small radius and a pair of outwardly curved intermediate portions 29, 30 (Fig. 8) merging into said land portions.

A take-up cam 36 mounted on said shaft adjacent to the feed cam has a peripheral cam face including a long outer land portion 37 of about 96 degrees and large constant radius as great as the radius of the outer land portion of the feed cam, a short opposite land portion 38 of small constant radius, and a pair of outwardly curved intermediate portions 39, 40 merging into the land portions and having radii respectively longer than the corresponding radii of the intermediate portions 29, 30 of the feed cam, all of the portions 37, 38, 39, 40 of the peripheral cam face of the take-up cam being respectively adjacent to the corresponding cam portions 27, 28, 29, 30 of the feed cam. The shaft and cams rotate in the direction of the arrows of Figs. 1 and 8, and the intermediate portion following the long land portion of the take-up cam has a longer radius than has the intermediate portion in advance of such long portion.

A coupling collar 42, 43 (Fig. 2) has a hub 42 secured fast on the shaft 17 and a flange 43 engaged flat against the take-up cam; and said cams and flanges are provided with a small pair of alined openings eccentric and parallel to the main shaft and receiving coupling pins 44 secured fast in these openings for holding the collars and cams against rotation relative to each other and the shaft. An angle plate 45 secured fast on the reciprocatory plate above the cams has at its lower part a horizontal upper abutment 46 engageable with the take-up cam; and an angle plate 47 secured fast to the reciprocatory plate below the feed cam has at its upper part a horizontal lower abutment 48 engageable with the feed cam and terminating short of the take-up cam.

The inner face of the take-up cam 36 adjacent to the long land portion 37 is cut away as at 49 to prevent engagement of the long land portion 37 by the lower abutment 48.

The cam face portions 27, 28, 29, 30, 37, 38, 39, 40 are of such radius and said abutments are of such distance apart that when the long land portion 37 of the take-up cam moves in engagement with the upper abutment 46, the opposite land portion 28 and intermediate portions 29, 30 of the feed cam will one at a time, engage the lower abutment, and when the long land portion 27 of the feed cam moves in engagement with the lower abutment 48, the short land and intermediate portions 38, 39, 40 of the take-up cam will, one at a time engage the upper abutment 46.

A cam collar 50, 51 having a hub 50 fast on the main shaft has a flange 51 provided with an in-and-out cam face 52, 53, 54, 55 faced toward and spaced from the cams 26, 36.

An oscillatory shaft 56 (Fig. 1) in said transverse bores of the ears 24 carries a follower lever 57 fast on the oscillatory shaft between said ears and having a rounded engagement end 58 (Fig. 2) engaging the in-and-out cam face. The other end of the oscillatory shaft carries an upwardly extending claw lever 60 having inturned claws 61 adapted to engage in marginal perforations 62 of the film 63 passing the film-gate.

A helical spring 64 carried on said oscillatory shaft and anchored to such shaft and one of said ears presses the follower lever to the in-and-out cam face. The in-and-out cam face is designed and positioned to cause the claws to move inwardly to engage the perforations when the reciprocatory plate is in upper position, and to remain in the perforations as the plate moves downwardly, and under the influence of the spring to withdraw the claws when the reciprocatory plate is in lower position and hold the claws withdrawn when the plate moves upwardly.

The opening of the shutter (not shown) is of such size as to remain open through about 90 degrees of the rotation of the shaft 17, and has a position to open just after the cam 36 has reached the position of Fig. 4 and to close a few degrees before the cam 36 reaches the position of Fig. 5. As the radius of the cam portion 37 is constant, the plate member 22 and the film are not moved while the shutter is open. The cams then pass to the positions of Figs. 6, 7 and 4 successively.

After the cams reach the position of Fig. 4 and before they reach the position of Fig. 5, an inclined cam face 53 (Figs. 4 and 8) and the raised land cam face 52 of the in-and-out cam reach the rounded end 58 of the follower lever thereby causing the claws 61 to enter the film perforation.

The cam portions 30, 28, 39, 27 are so designed that the plate 22 and film remain stationary in the position of Figs. 4 and 5 when the claws move into the perforations of the stationary film, and the film and plate 22 start slowly and move down from the position of Figs. 4 and 5 to the lower limit position of Fig. 6 with about 60 degrees rotation of the cams. When the cams have reached the position of Fig. 6, the plate 22 and film are stationary and the cam face 55 engages the lever end 58, withdrawing the claws from the then stationary film before the cams move from the position of Fig. 7 and then returns, while the claws are still withdrawn, to the position of Fig. 4. The film is always stationary when the claws move into or out of the perforations, thus avoiding damage to the film perforations.

The three cams may be made to run in oil by any well known suitable oiling system.

Figs. 9 and 10 show an alternative cam arrangement which has been found quite effective for ease of movement without noise or jar.

In Figs. 9 and 10 all features are the same as in Figs. 1 to 8 except that the abutments 46, 48 fast on, and transverse to the path of the reciprocatory member 22 are closer together than the largest diameter of take-up cam 36a; and the largest diameter of the feed cam 26a is smaller than said distance. However, the peripheral cam faces of the respective cams 26a, 36a are at all times engageable with said feed and take-up abutments 46, 48 respectively.

Said cam 26a has a peripheral cam face including a long outer land portion 27a (Fig. 10) of about 60 degrees and long radius, an opposite land portion 28a of short radius and a pair of outwardly curved intermediate portions 29a, 30a merging into said land portions.

The take-up cam 36a has a peripheral cam face including a long outer land portion 37a of about 96 degrees and large constant radius greater than the radius of the outer land portion of the feed cam, a short opposite land portion 38a of small constant radius, and a pair of outwardly curved intermediate portions 39a, 40a merging into the land portions and having radii respectively much longer than the corresponding radii of the intermediate portions 29a, 30a of the feed cam.

The land portion 27a is adjacent to the land portion 37a; and the intermediate portion 39a following the long land portion 37a of the take-up cam 36a has a slightly longer radius than has the intermediate portion 40a in advance of such long portion.

The operation of the mechanism having the cam arrangement of Figs. 9 and 10 is practically the same as that of Figs. 1 to 8.

The invention claimed is:

1. In combination, a reciprocatory member having fast thereon opposing abutments transverse to its path; a rotary drive shaft between said abutments; feed and take-up cams fast on said shaft, each having peripheral cam faces, said faces of the respective cams being at all times engageable with said feed and take-up abutments respectively, and each including a long land portion of constant long radius and an opposite land portion of short constant radius and a pair of intermediate cam portions merging smoothly into the land portions, the portions of each cam being adjacent corresponding portions of the other cam; the land portions holding said reciprocatory member stationary; the long land portions of the take-up cam being as long as about 96 degrees and much longer than the long land portion of the feed cam; the intermediate portion of the take-up cam and the opposite intermediate portion of the feed cam being designed to slowly start said member from rest and move the member from one rest position to the other in about sixty degrees of cam rotation.

2. A film feed comprising a reciprocatory member having fast thereon opposing abutments transverse to its path; a rotary drive shaft; feed and take-up cams fast on said shaft and having peripheral cam faces at all times engageable with said feed and take-up abutments respectively, the peripheral face of each cam including a long land portion of long radius and an opposite land portion of short radius and intermediate portions between the other portions, the portions of each cam being adjacent corresponding portions of the other cam.

3. A film feed as in claim 2, the long land portion of one cam being longer than the long land portion of the other cam.

4. A film feed as in claim 2 the long land portion of the take-up cam being longer than the long land portion of the feed cam and about ninety degrees in length.

5. A film feed as in claim 2, diameters of the respective cams being substantially the same.

6. A film feed as in claim 2 the longest diameters of the respective cams being of different length.

7. A film feed as in claim 2 the longest diameter of the take-up cam being much longer than the longest diameter of the feed cam.

8. A film feed as in claim 2, the long land portion of the take-up cam being of substantially constant radius.

9. A film feed as in claim 2, the long land portion of the feed cam being of substantially constant radius.

10. In combination, a reciprocatory member having fast thereon opposing abutments transverse to its path; a rotary drive shaft; feed and take-up cams fast on said shaft and having endless peripheral cam faces engageable with said feed and take-up abutments respectively and each including a long land portion of long radius and an opposite land portion of short radius, the portions of each cam being adjacent to corresponding portions of the other cam; the long land portion of the take-up cam being of substantially constant radius and as long as about 96 degrees and much longer than the long land portion of the feed cam.

11. A film feed comprising a reciprocatory member having fast thereon opposing abutments transverse to its path; a rotary drive shaft; feed and take-up cams fast on said shaft and having peripheral cam faces the faces of the cams respectively being at all times engageable with said feed and take-up abutments respectively, the peripheral face of the take-up cam including a long land portion of long radius and an opposite land portion of short radius and intermediate portions between the other portions; the longest radius of the take-up cam being longer than the longest radius of the feed cam.

12. A film feed comprising a reciprocatory member having fast thereon opposing abutments transverse to its ptth; a rotary drive shaft between said abutments; feed and take-up cams fast on said shaft and having peripheral cam faces the faces of the cams respectively being at all times engageable with said feed and take-up abutments respectively, the peripheral face of each cam including a long land portion of substantially constant long radius and an opposite land portion of short radius and opposite intermediate portions between and merging into the other portions, the portions of each cam being adjacent corresponding portions of the other cam; the long land portion of the take-up cam being much longer than the long land portion of the feed cam; the distance between said abutments being less than the longest diameter of the take-up cam and greater than the longest diameter of the feed cam.

13. A film feed mechanism comprising a reciprocatory member having fast thereon opposing abutments transverse to its path; a rotary drive shaft between said abutments; feed and take-up cams fast on said shaft and having peripheral cam faces at all times engageable with said feed and take-up abutments respetcively and each including a long land portion of constant long radius, an opposite land portion of short radius and a pair of intermediate cam portions merging smoothly into the land portions, the portions of each cam being adjacent corresponding portions of the other cam; claw means operated by said shaft to engage the film and feed the film after the long land portion of the take-up cam reaches the take-up abutment and to disengage the film after the long land portion of the feed cam reaches the feed abutment; the radii of the intermediate portions of the take-up cam being longer than the corresponding radii of the feed cam; the long land portions of the take-up cam, engaging the take-up abutment during film exposure and being as long as about 96 degrees and much longer than the long land portion of the feed cam.

14. A film feed mechanism comprising a reciprocatory member carrying opposing transverse abutments; a rotary drive shaft between said abutments; feed and take-up cams fast on said shaft and having peripheral cam faces at all times engageable with said feed and take-up abutments respectively and each including a long land portion of long radius, an opposite land portion of short radius and a pair of intermediate cam portions merging smoothly into the land portions, the portions of each cam being adjacent corresponding portions of the other cam; means to engage and feed the film after the long land portion of the take-up cam leaves the take-up abutment and to disengage the film after the long land portion of the feed cam reaches the feed abutment; the long land portion of the take-up cam, engaging the take-up abutment during film exposure; and being as long as about 96 degrees and much longer than the long land portion of the feed cam; whereby the film may be held in exposure position during as much as 96 degrees of the revolution of the drive shaft.

15. A film feed comprising a reciprocatory member having fast thereon opposing abutments transverse to its path; a rotary drive shaft; feed and take-up cams fast on said shaft and having peripheral cam faces, the faces of the cams respectively being at all times engageable with said feed and take-up abutments respectively, the peripheral face of the cams being contoured to reciprocate the member and hold it stationary for a time at each limit of movement; means for guiding a film; a lever pivotally mounted on said member and having feeding means engageable with the film; and an in-and-out cam on said shaft having a cam face against which said lever is urged; said cam face being contoured to move the feeding means to and from the film when said member is stationary and to hold the feeding means in engagement with the film when said member moves in one direction and away from the film when the member moves in the other direction.

16. A film feed comprising a reciprocatory member having fast thereon opposing abutments transverse to its path; a rotary drive shaft; feed and take-up cams fast on said shaft and having peripheral cam faces engageable with said feed and take-up abutments respectively, the peripheral face of each cam including a long land portion of substantially constant long radius and an opposite land portion of short radius; engagement of the constant radius portions with the abutments holding said member substantially stationary; means for guiding a film; a claw lever pivotally mounted on said member and having claws engageable in perforations with the film; and an in-and-out cam on said shaft having a cam face against which said lever is urged; said cam face being contoured to move the claws to and from the perforations when said member is stationary and to hold the claws in the perforations when said member moves in one direction and away from the film when the member moves in the other direction.

17. A film feed comprising a reciprocatory member having fast thereon opposing abutments transverse to its path; a rotary drive shaft; feed and take-up cams fast on said shaft and having peripheral cam faces the faces of the cams respectively being at all times engageable with said feed and take-up abutments respectively, the peripheral face of each cam including a long land portion of constant long radius and an opposite land portion of short radius; engagement of the constant radius portions with the abutments holding said member substantially stationary; the longest diameter of the take-up cam being much longer than the longest diameter of the feed cam; means for guiding a film; a claw lever pivotally mounted on said member and having claws engageable in perforations with the film; and an in-and-out cam on said shaft having a cam face against which said lever is urged into engagement; said cam face being constructed to move the claws to and from the perforations when said member is stationary and to hold the claws in the perforations when said member moves in one direction and away from the film when the member moves in the other direction.

18. A film feed comprising a reciprocatory member having fast thereon opposing abutments transverse to its path; a rotary drive shaft; feed and take-up cams fast on said shaft and having peripheral cam faces the faces of the cams respectively being at all times engageable with said feed and take-up abutments respectively, the peripheral face of each cam including a long land portion of constant long radius and an opposite land portion of short radius and intermediate portions between the other portions; engagement of the constant radius portions with the abutments holding said member substantially stationary; the long diameters of the cams being about equal; the long land portion of the take-up cam being much longer than the long land portion of the feed cam; means for guiding a film; a claw lever pivotally mounted on said member and having claws engageable in perforations with the film; and an in-and-out cam on said shaft having a cam face against which said lever is urged into engagement; said cam face being contoured to move the claws to and from the perforations when said member is stationary and to hold the claws in the perforations when said member moves in one direction and away from the film when the member moves in the other direction.

TILGHMAN G. FREDERICK.

REFERENCES CITED

The following references are of record in the file of this patent:

UNITED STATES PATENTS

| Number | Name | Date |
| --- | --- | --- |
| 1,542,409 | Readeker | June 16, 1925 |
| Re. 16,769 | Gauriat | Oct. 11, 1927 |

FOREIGN PATENTS

| Number | Country | Date |
| --- | --- | --- |
| 158,824 | British | Jan. 15, 1921 |